(12) United States Patent
Yelmule et al.

(10) Patent No.: US 8,276,390 B2
(45) Date of Patent: Oct. 2, 2012

(54) METHOD AND SYSTEM FOR PROVIDING A SPLITTER TO IMPROVE THE RECOVERY OF COMPRESSOR DISCHARGE CASING

(75) Inventors: Mukesh Marutrao Yelmule, Bangalore (IN); Carl Gerard Schott, Simpsonville, SC (US)

(73) Assignee: General Electric Company, Schnectady, NY (US)

( * ) Notice: Subject to any disclaimer, the term of this patent is extended or adjusted under 35 U.S.C. 154(b) by 202 days.

(21) Appl. No.: 12/761,073

(22) Filed: Apr. 15, 2010

(65) Prior Publication Data
US 2011/0252804 A1   Oct. 20, 2011

(51) Int. Cl.
*F02C 1/00* (2006.01)
(52) U.S. Cl. .................................. 60/772; 60/39.37
(58) Field of Classification Search ............ 60/751–760, 60/39.37
See application file for complete search history.

(56) References Cited

U.S. PATENT DOCUMENTS

| | | | |
|---|---|---|---|
| 4,297,843 A | 11/1981 | Sato et al. | |
| 4,458,479 A | 7/1984 | Reider et al. | |
| 4,719,748 A * | 1/1988 | Davis et al. | 60/39.37 |
| 5,335,501 A | 8/1994 | Taylor | |
| 5,737,915 A | 4/1998 | Lin et al. | |
| 6,672,070 B2 * | 1/2004 | Bland et al. | 60/772 |
| 7,047,723 B2 | 5/2006 | Martling et al. | |
| 7,584,620 B2 * | 9/2009 | Weaver et al. | 60/796 |
| 2007/0271923 A1 * | 11/2007 | Dawson | 60/751 |
| 2010/0239418 A1 * | 9/2010 | Schott et al. | 415/207 |

FOREIGN PATENT DOCUMENTS

| | | |
|---|---|---|
| EP | 0789195 A1 | 8/1997 |
| GB | 2440343 A | 1/2008 |

OTHER PUBLICATIONS

EP Search Report and Opinion issued Sep. 5, 2011 in connection with corresponding Application No. EP 11162104.1.
PCT Search Report and Written Opinion issued Sep. 6, 2011 in connection with corresponding Application No. PCT/US2011/030452.
Maekawa, Atsushi et al.; Development and In-house Shop Load Test Results of M701G2 Gas Turbine; article; May 17, 2003; pp. 1-7.
Mitsubishi completes the M701G2 Gas Turbine Shop Load Test; www.mhi.co.jp/en/power/news/sec1/2002_sep_03.html; 2 pages.
GT24/GT26 Gas Turbine; Brochure; Alstom (Switzerland) Ltd; 20 pages.
Gas Turbine Range Overview Technical Performance Data Sheet; www.power.alstom.com; 2 pages.

* cited by examiner

*Primary Examiner* — Phutthiwat Wongwian
(74) *Attorney, Agent, or Firm* — Armstrong Teasdale LLP

(57) ABSTRACT

A splitter is provided for improving a pressure recovery of a compressor discharge casing (CDC) by substantially aligning a fluid vortex about a longitudinal axis of a gas turbine engine. The CDC includes an annular wall that extends generally axially along at least a portion of the CDC. The CDC is configured to house a first combustor and a second combustor. The splitter extends from the annular wall between the first and second combustors. The splitter includes a first surface that is configured to direct fluid towards the first combustor and a second surface that is configured to direct fluid towards the second combustor.

18 Claims, 3 Drawing Sheets

METHOD AND SYSTEM FOR PROVIDING A SPLITTER TO IMPROVE THE RECOVERY OF COMPRESSOR DISCHARGE CASING

BACKGROUND OF THE INVENTION

The subject matter disclosed herein relates generally to gas turbine engines and, more particularly, to a gas turbine engine including a compressor assembly with a splitter.

At least some known gas turbine engines channel air through a compressor assembly and, more specifically, a compressor discharge casing (CDC) that encases an array of combustors. As the air is channeled through the CDC, the air is compressed between adjacent combustors, and vortices form along the meridional planes of the CDC. The compression of the air produces a local acceleration and weak diffusion air stream that may result in a low pressure recovery. Accordingly, a more efficient method and/or system for channeling air through the compressor assembly are desired.

BRIEF SUMMARY OF THE INVENTION

In one aspect, a method is provided for assembling a gas turbine engine. The method includes providing a compressor discharge casing (CDC) including an annular wall that extends generally axially along at least a portion of the CDC. The CDC is coupled to a combustor casing such that a first combustor and a second combustor are housed within the annular wall. A splitter extends from the annular wall between the first and second combustors. The splitter includes a first surface that is configured to direct fluid towards the first combustor and a second surface that is configured to direct fluid towards the second combustor.

In another aspect, a compressor assembly is provided for use with a gas turbine engine. The compressor assembly includes a compressor discharge casing (CDC) including an annular wall that extends generally axially along at least a portion of the CDC. The CDC is configured to house a first combustor and a second combustor. A splitter extends from the annular wall between the first and second combustors. The splitter includes a first surface that is configured to direct fluid towards the first combustor and a second surface that is configured to direct fluid towards the second combustor.

In yet another aspect, a gas turbine engine is provided. The gas turbine engine includes a first combustor, a second combustor, a compressor discharge casing (CDC), and a splitter. The CDC includes an annular wall that extends generally axially along at least a portion of the CDC. The CDC houses the first and second combustors. The splitter extends from the annular wall between the first and second combustors. The splitter includes a first surface that is configured to direct fluid towards the first combustor and a second surface that is configured to direct fluid towards the second combustor.

DETAILED DESCRIPTION OF THE INVENTION

The methods and systems described herein facilitate improving a pressure recovery of a compressor discharge casing (CDC) by substantially aligning a fluid vortex about a longitudinal axis of a gas turbine engine.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine.

Figure 1:
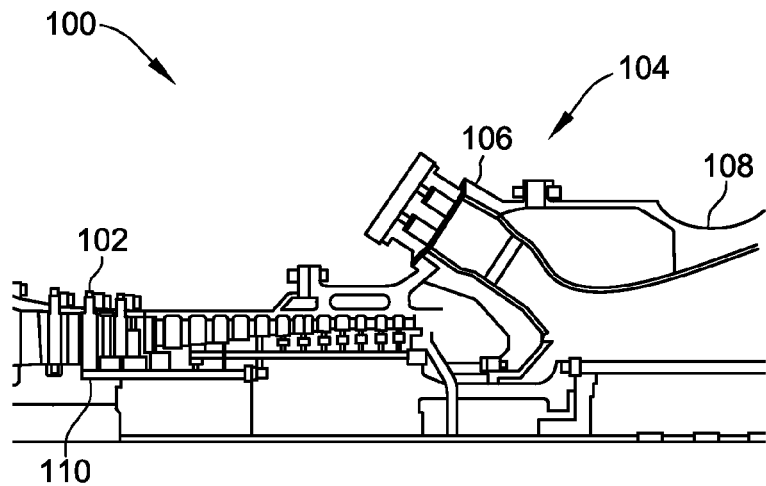
FIG. 1 is an illustration of a side perspective of an exemplary gas turbine engine.

FIG. 1 is an illustration of a side perspective of an exemplary gas turbine engine 100. In the exemplary embodiment, gas turbine engine 100 includes, in serial flow arrangement, a compressor 102, a combustor assembly 104 including a plurality of combustors 106, and a turbine 108. Combustors 106 are spaced in an annular array extending about a shaft 110 that extends between and rotatably couples compressor 102 and turbine 108.

Figure 2:
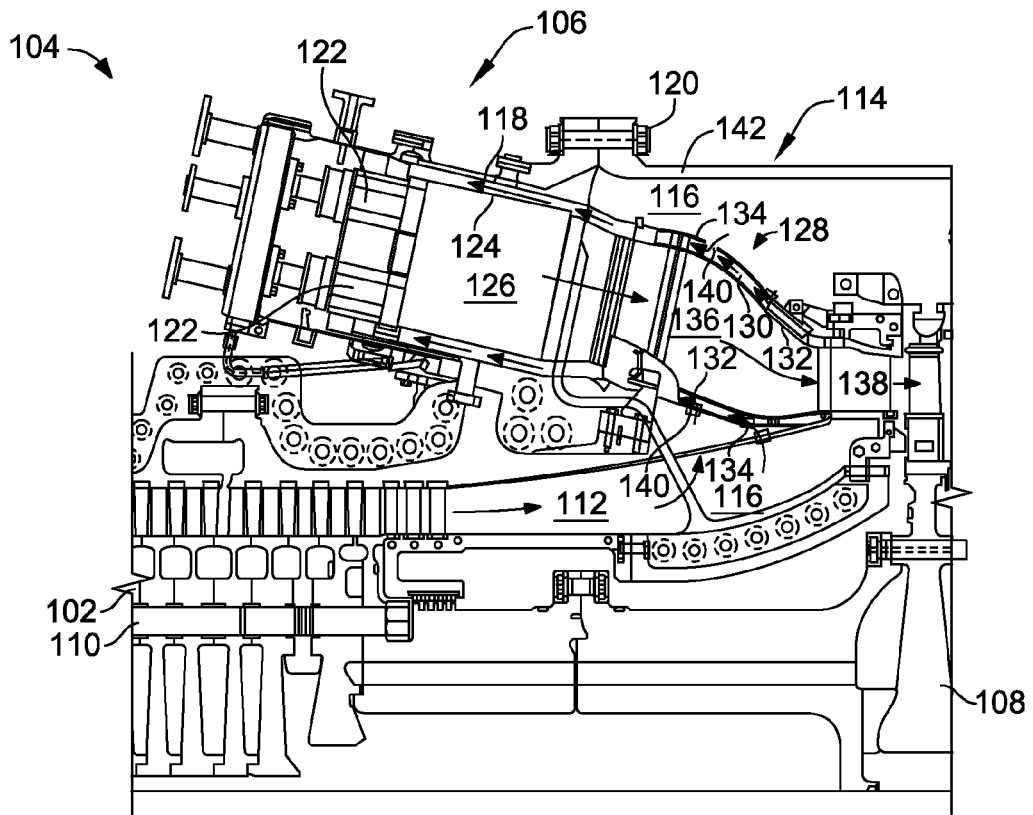
FIG. 2 is an illustration of a side perspective of an exemplary combustor that may be used with the gas turbine engine shown in FIG. 1.

FIG. 2 is an illustration of a side perspective of one combustor 106. In the exemplary embodiment, compressor 102 includes a diffuser 112 defined therein. Moreover, in the exemplary embodiment, compressor 102 includes a compressor discharge casing (CDC) 114 including a compressor discharge plenum 116 defined therein.

In the exemplary embodiment, combustor assembly 104 includes a combustor casing 118 that is coupled to CDC 114 via a fastener 120. In the exemplary embodiment, combustor casing 118 extends about combustor assembly 104 and houses a plurality of fuel nozzle assemblies 122 and a combustor liner 124 including a combustion chamber 126 defined therein.

In the exemplary embodiment, combustor assembly 104 also includes a transition piece assembly 128. More specifically, in the exemplary embodiment, CDC 114 houses transition piece assembly 128 defining an annular passage 130 that extends between an inner wall 132 and an outer wall 134 of transition piece assembly 128. Inner wall 132 includes a guide cavity 136 defined therein. In one embodiment, inner wall 132 may be referred to as a transition piece, and outer wall 134 may be referred to as an impingement sleeve.

In the exemplary embodiment, inner wall 132 channels combustion gases generated in combustion chamber 126 downstream towards a turbine nozzle 138. In the exemplary embodiment, outer wall 134 includes a plurality of openings 140 defined therein.

During operation, turbine 108 drives compressor 102 via shaft 110. As compressor 102 is rotated, air is compressed as it flows downstream therethrough. Compressed air discharged from compressor 102 is channeled towards combustor 106, wherein the compressed air is mixed with fuel and ignited to generate combustion gases. More specifically, in the exemplary embodiment, compressor 102 discharges compressed air through diffuser 112 and compressor discharge plenum 116 towards combustor 106, as illustrated by the associated arrows. More specifically, in the exemplary embodiment, compressed air is discharged through compressor discharge plenum 116 and into annular passage 130 via openings 140.

Compressed air entering annular passage 130 is directed into fuel nozzle assemblies 122, wherein the compressed air is mixed with fuel. The mixture is ignited within combustion chamber 126 to generate combustion gases. Combustion gases are discharged from combustion chamber 126 through guide cavity 136 and towards turbine nozzle 138. Turbine 108 converts the gas thermal energy of the combustion gases into mechanical rotational energy for use in rotating shaft 110.

Figure 3:
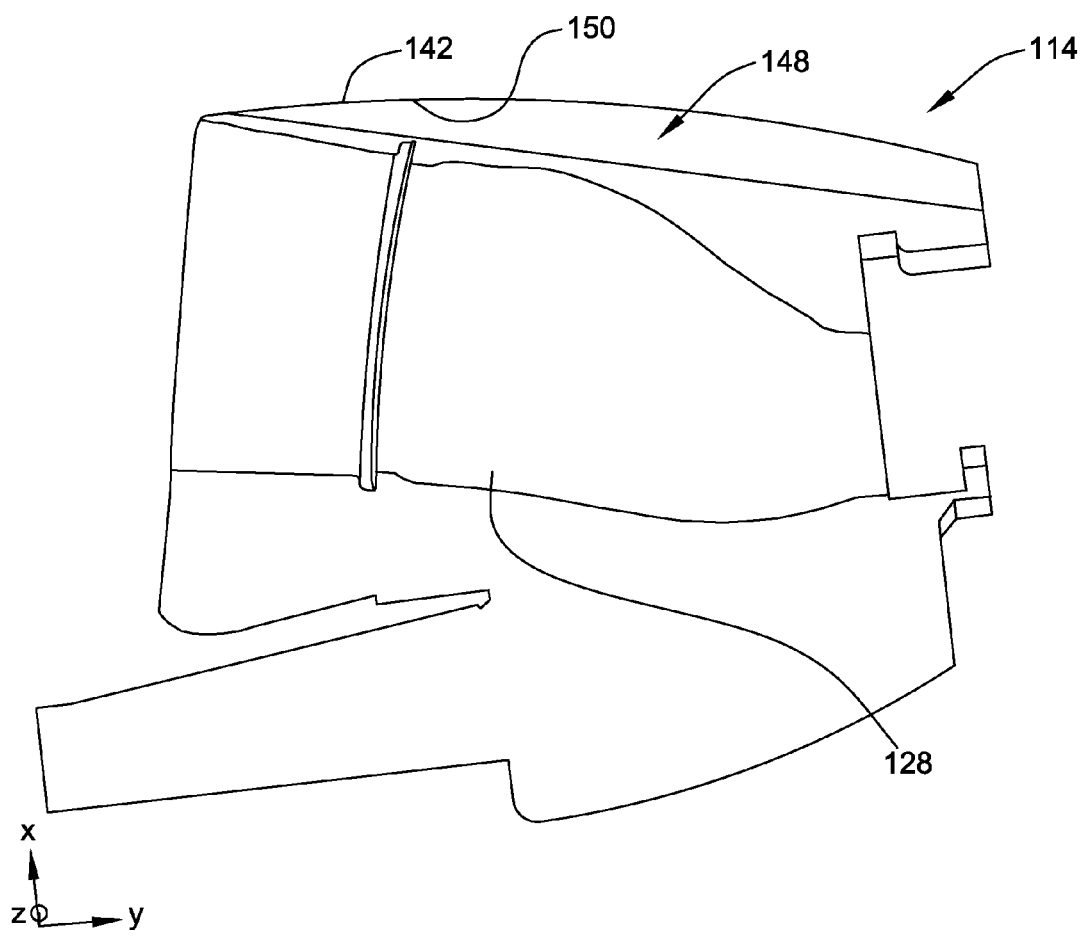
FIG. 3 is an illustration of a side perspective of an exemplary compressor discharge casing (CDC) that may be used with the gas turbine engine shown in FIG. 1.
Figure 4:
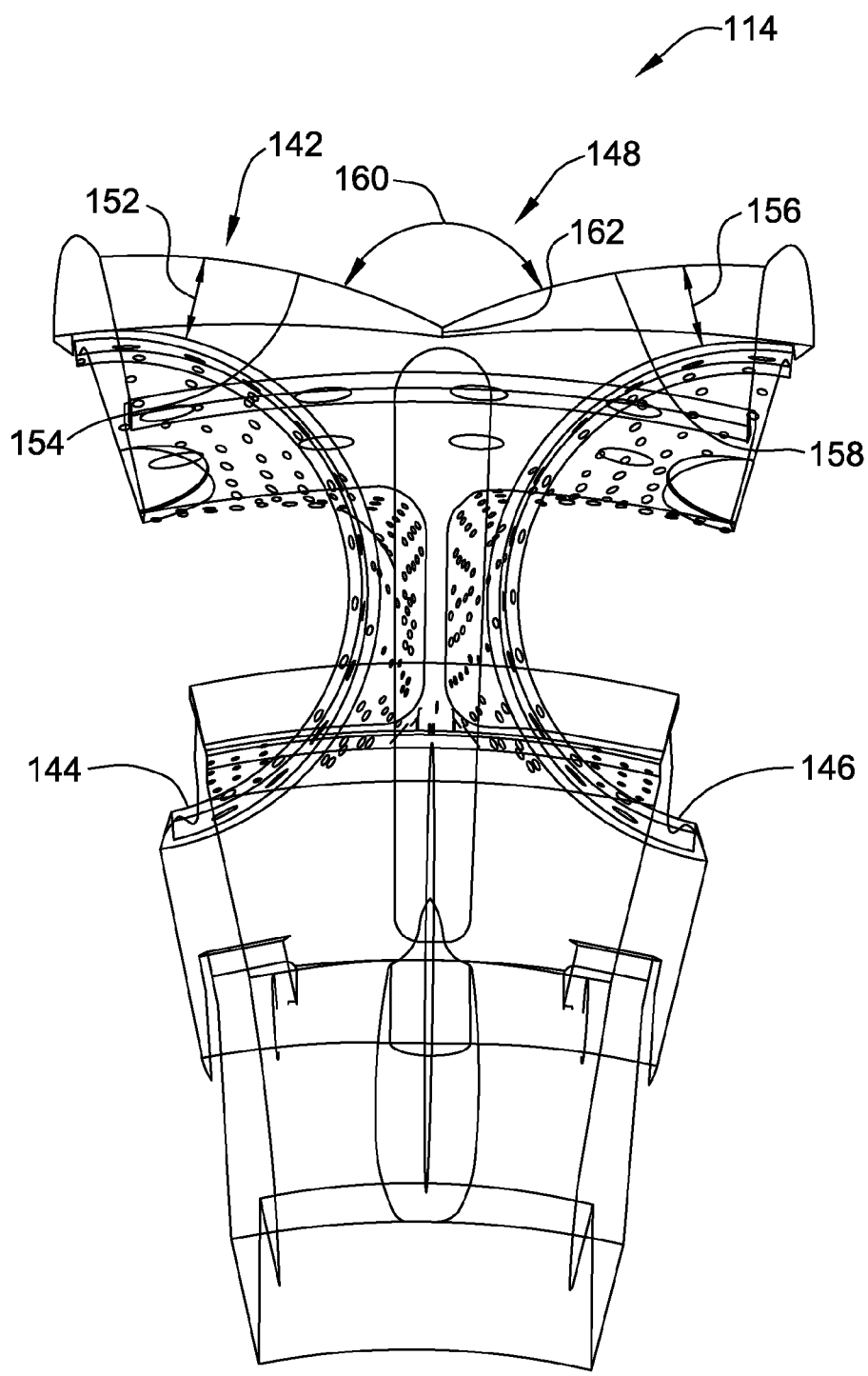
FIG. 4 is an illustration of an end perspective of the CDC shown in FIG. 3.

FIG. 3 is an illustration of a side perspective of CDC 114, and FIG. 4 is an illustration of an end perspective of CDC 114. In the exemplary embodiment, CDC 114 includes a wall 142 that extends generally axially along at least a portion of CDC 114. Moreover, in the exemplary embodiment, wall 142 is coupled to combustor casing 118 via fastener 120. Wall 142 and combustor casing 118 house combustors 106 and, more specifically, a plurality of transition piece assemblies 128 therein. More specifically, in the exemplary embodiment, combustor casing 118 houses a first combustor surface 144 and a second combustor surface 146. In one embodiment, combustor surfaces 144 and 146 may be referred as impingement sleeves.

In the exemplary embodiment, a splitter 148 extending from wall 142 facilitates improving the pressure recovery of CDC 114. More specifically, splitter 148 extends radially inward from an inner surface 150 of wall 142. Moreover, in the exemplary embodiment, splitter 148 extends substantially circumferentially between two adjacent transition piece assemblies 128, such as first and second combustor surfaces 144 and 146. More specifically, in the exemplary embodiment, splitter 148 is positioned and/or spaced substantially equidistantly from first and second combustor surfaces 144 and 146 such that a distance 152 from a point on a first surface 154 to a point on first combustor surface 144 is approximately equal to a distance 156 from a corresponding point on a second surface 158 to a corresponding point on second combustor surface 146. Alternatively, splitter 148 may be positioned anywhere within CDC 114 that enables a desired air flow being formed, as described herein.

In the exemplary embodiment, first and second surfaces 154 and 158 are formed so that each is generally concave. Alternatively, first surface 154 and/or second surface 158 may be formed with any shape that enables a desired air flow to be formed. For example, in the exemplary embodiment, second surface 158 is displaced at an angle 160 from first surface 154 such that first surface 154 is oriented to direct fluid towards first combustor surface 144, and second surface 158 is oriented to direct fluid towards second combustor surface 146. In the exemplary embodiment, first and second surfaces 154 and 158 are formed integrally with wall 142. Alternatively, splitter 148 may include a coupling surface (not shown) that is coupled to wall 142.

First and second surfaces 154 and 158 extend generally axially along at least a portion of CDC 114. In the exemplary embodiment, first surface 154 is coupled to second surface 158 at an apex 162 that extends axially along a portion of CDC 114. Alternatively, first surface 154 and/or second surface 158 may be coupled to a surface (not shown) extending between first surface 154 and second surface 158. In the exemplary embodiment, first surface 154 is oriented in a mirrored relationship with respect to second surface 158 such that first and second surfaces 154 and 158 are substantially symmetrical about apex 162. Alternatively, first surface 154 and/or second surface 158 may be oriented in any non-symmetrical orientation that enables a desired air flow to be formed.

During operation, compressed air is channeled through compressor discharge plenum 116. Splitter 148 redirects a portion of the air flow within compressor discharge plenum 116 to facilitate increasing a circulation about an axis of gas turbine engine 100. More specifically, in the exemplary embodiment, first surface 154 directs a first air flow towards first combustor surface 144, and second surface 158 directs a second air flow towards second combustor surface 146. In the exemplary embodiment, the first air flow circulates in a counterclockwise direction about the longitudinal axis and the second air flow circulates in a clockwise direction about the longitudinal axis. The separation of the first and second air flows facilitate reducing a cross communication of air flow between combustor surfaces 144 and 146.

Exemplary embodiments of the compressor discharge casing and methods for assembling the compressor discharge casing are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with gas turbine engines as described herein. Rather, the present invention can be implemented and utilized in connection with many other industries.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a gas turbine engine, said method comprising:
   providing a compressor discharge casing (CDC) including an annular wall that extends generally axially along at least a portion of the CDC;
   coupling the CDC to a combustor casing such that a first combustor and a second combustor are housed within the annular wall; and
   extending a splitter from the annular wall between the first and second combustors, wherein the splitter includes a first surface configured to direct fluid towards the first combustor and a second surface configured to direct fluid towards the second combustor, wherein said first and second surfaces extend substantially in axial and circumferential directions to direct fluid into vortices extending about said respective first and second combustors.

2. A method in accordance with claim 1, wherein extending a splitter further comprises spacing the splitter substantially equidistantly from the first and second combustors.

3. A method in accordance with claim 1, wherein extending a splitter further comprises forming at least one of the first and second surfaces to have a generally concave shape.

4. A method in accordance with claim 1, wherein extending a splitter further comprises forming the splitter integrally with an inner surface of the annular wall such that the splitter extends radially inward from the annular wall.

5. A method in accordance with claim 1, wherein extending a splitter further comprises coupling the first surface to the second surface at an apex that extends generally axially along at least a portion of the CDC.

6. A method in accordance with claim 1, wherein extending a splitter further comprises orienting the first surface to be substantially symmetrical to the second surface.

7. A compressor assembly comprising:
   a compressor discharge casing (CDC) comprising an annular wall coupled to a combustor casing, the annular wall extends generally axially along at least a portion of said CDC, said CDC configured to house a first combustor and
   a second combustor; and
   a splitter extending radially inward from said annular wall between the first and second combustors, said splitter comprising a first surface configured to direct fluid towards the first combustor and a second surface configured to direct fluid towards the second combustor, wherein said first and second surfaces extend substantially in axial and circumferential directions to direct fluid into vortices extending about said respective first and second combustors.

8. A compressor assembly in accordance with claim 7, wherein said splitter is positioned substantially equidistantly from the first and second combustors.

9. A compressor assembly in accordance with claim 7, wherein at least one of said first and second surfaces has a generally concave shape.

10. A compressor assembly in accordance with claim 7, wherein said splitter is formed integrally with said annular wall.

11. A compressor assembly in accordance with claim 7, wherein said first surface is coupled to said second surface at an apex that extends generally axially along at least a portion of said CDC.

12. A compressor assembly in accordance with claim 7, wherein said first surface is substantially symmetrical to said second surface.

13. A gas turbine engine comprising:
   a first combustor;
   a second combustor;
   a compressor discharge casing (CDC) comprising an annular wall coupled to a combustor casing, the annular wall extends generally axially along at least a portion of said CDC, said CDC housing said first and second combustors; and
   a splitter extending radially inward from said annular wall between said first and second combustors, said splitter comprising a first surface configured to direct fluid towards said first combustor and a second surface configured to direct fluid towards said second combustor, said first and second surfaces extend substantially in axial and circumferential directions to direct fluid into vortices extending about said respective first and second combustors.

14. A gas turbine engine in accordance with claim 13, wherein said splitter is positioned substantially equidistantly from said first and second combustors.

15. A gas turbine engine in accordance with claim 13, wherein at least one of said first and second surfaces has a generally concave shape.

16. A gas turbine engine in accordance with claim 13, wherein said splitter is formed integrally with said annular wall.

17. A gas turbine engine in accordance with claim 13, wherein said first surface is coupled to said second surface at an apex that extends generally axially along at least a portion of said CDC.

18. A gas turbine engine in accordance with claim 13, wherein said first surface is substantially symmetrical to said second surface.

\* \* \* \* \*